United States Patent [19]
Guillemot

[11] 4,357,131
[45] Nov. 2, 1982

[54] DETECTOR FOR CONTROLLING THE OPERATION OF A SUCTION PUMP

[76] Inventor: Gilbert Guillemot, 7, rue de la Libération, 95650 Courcelles-sur-Viosne, France

[21] Appl. No.: 163,522

[22] Filed: Jun. 27, 1980

[30] Foreign Application Priority Data

Jul. 4, 1979 [FR] France .................. 79 17318

[51] Int. Cl.³ .............................................. F04B 49/06
[52] U.S. Cl. ........................................ 417/12; 417/36
[58] Field of Search ............... 417/36, 12; 307/118, 307/125; 137/392, 395

[56] References Cited

U.S. PATENT DOCUMENTS

| | | | |
|---|---|---|---|
| 943,369 | 12/1909 | Otto | 417/36 X |
| 3,339,578 | 9/1967 | Smith | 307/118 X |
| 3,362,334 | 1/1968 | Ramsay | 417/44 |
| 3,616,824 | 11/1971 | Orlando | 137/392 X |
| 3,657,556 | 4/1972 | Foster | 307/118 |
| 4,083,657 | 4/1978 | Misener | 417/63 X |
| 4,171,932 | 10/1979 | Miller | 417/36 |

FOREIGN PATENT DOCUMENTS

| | | |
|---|---|---|
| 500203 | 6/1930 | Fed. Rep. of Germany . |
| 1273443 | 7/1968 | Fed. Rep. of Germany . |
| 1256197 | 3/1960 | France . |
| 1562012 | 1/1968 | France . |
| 478955 | 10/1975 | U.S.S.R. ................ 417/36 |

*Primary Examiner*—William L. Freeh
*Assistant Examiner*—Edward Look
*Attorney, Agent, or Firm*—Sandler & Greenblum

[57] ABSTRACT

A suction pump has a suction pipe extending into a tank for receiving liquid. A detector, connected to a control circuit for the pump, is arranged to initiate operation of the pump when the liquid in the tank rises above a predetermined level. The detector comprises a hollow member of insulating material connected to the free end of the suction pipe. The member has a transverse dimension which is greater than that of the suction pipe whereby a shoulder is defined which connects the member to the pipe. Two or more electrodes are mounted on the member and the pump is operated when the liquid completes a circuit between the two electrodes. The electrodes are protected by the shoulder from liquid running backwardly within the suction pipe when the pump has stopped. In addition, a time delay means is included in the control circuit to delay restarting of the pump once it has stopped.

9 Claims, 2 Drawing Figures

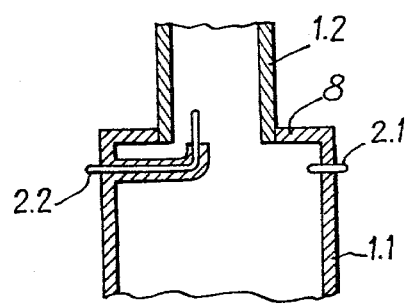

DETECTOR FOR CONTROLLING THE OPERATION OF A SUCTION PUMP

BACKGROUND TO THE INVENTION

The present invention relates to a detector for controlling the operation of a suction pump arranged to pump liquid when the level of liquid reaches a predetermined upper limit and to stop as soon as the level falls to a predetermined lower limit.

Detectors for controlling pumps are known which comprise floats or elements subjected to the thrust of the liquid. As the result of wear, corrosion or possible blockage by foreign bodies, the operation of such detectors is not reliable. Moreover, they are practically useless in mobile installations which may be subjected to considerable inclinations, such as boats or floating platforms.

The present invention does not use any movable element displaced by the liquid which is to be pumped. Instead, the invention utilises, fixed electrodes forming part of an electric control circuit for the pump. Electrode type detectors are also known and examples are described in German Patent Specification Nos. 500,203 and 1,273,443, and French Patent Specification Nos. 1,256,197 and 1,562,012. The known detector which is closest to that of the invention is described in French Patent Specification No. 1,256,197. However, this known detector is designed and connected to an electric circuit for the purpose of maintaining the level of a liquid between two fairly close limits in order to ensure adequate filling of a tank.

The present invention seeks to eliminate as far as possible a liquid which has penetrated into a vessel and has risen to an unacceptable level; in addition, the invention makes it possible to obtain the clean stopping of the pump when the level of liquid has reached a predetermined lower limit. Such a clean stoppage cannot be achieved with the detector of the abovmentioned French Pat. No. 1,256,197.

One particular use for a detector of the invention is the control of a bilge pump in a ship; the liquid to be pumped out is very often seawater, which is a good conductor of electricity and with which up to the present time it has been practically impossible to obtain clean stopping of the pumping because the slightest wet layer between the electrodes is sufficient to join them electrically and to cause the pump to operate.

SUMMARY OF THE INVENTION

According to the present invention there is provided in apparatus for pumping liquid from a tank, the apparatus comprising a suction pump having a suction pipe extending into the tank and a control circuit for controlling the operation of the pump, a detector connected to the control circuit and arranged to control the operation of the pump in dependence upon the level of liquid within the tank, the detector comprising an elongate member of insulating material connected to the free end of the suction pipe and extending below an upper level for liquid in the tank, said member being spaced in the transverse direction outwardly of the suction pipe to thereby define a peripheral zone between the suction pipe and said member, and at least first and second spaced electrodes mounted on said member so as to extend inwardly of said member, at least the first electrode not extending beyond said peripheral zone.

In an embodiment of the invention at least one of the electrodes also extends outwardly of said member of insulating material.

In one embodiment the two electrodes are spaced apart both in the vertical direction and angularly. Furthermore, a third electrode may be provided which is mounted on said member externally thereof and substantially at the same level, but angularly spaced from, the lower of the two electrodes. This third electrode is connected to a more sensitive input of an amplifier which forms part of the control circuit for controlling the supply of electricity to the pump motor and to which the electrodes are connected.

In another embodiment of the invention one of the electrodes extends into a central zone of the member of insulating material, which zone is axially aligned with the passage through the suction pipe, and this electrode is insulated in that portion of its length which is situated in said peripheral zone.

The electrodes may be connected to the electric control circuit by way of a time delay element which delays the putting of the pump into operation for a predetermined period.

BRIEF DESCRIPTION OF THE DRAWINGS

Embodiments of the present invention will hereinafter be described, by way of example, with reference to the accompanying drawings, in which:

FIG. 2 is a detail view on a larger scale, showing a modified version of part of the detector of FIG. 1.

DESCRIPTION OF THE PREFERRED EMBODIMENTS

Figure 1:
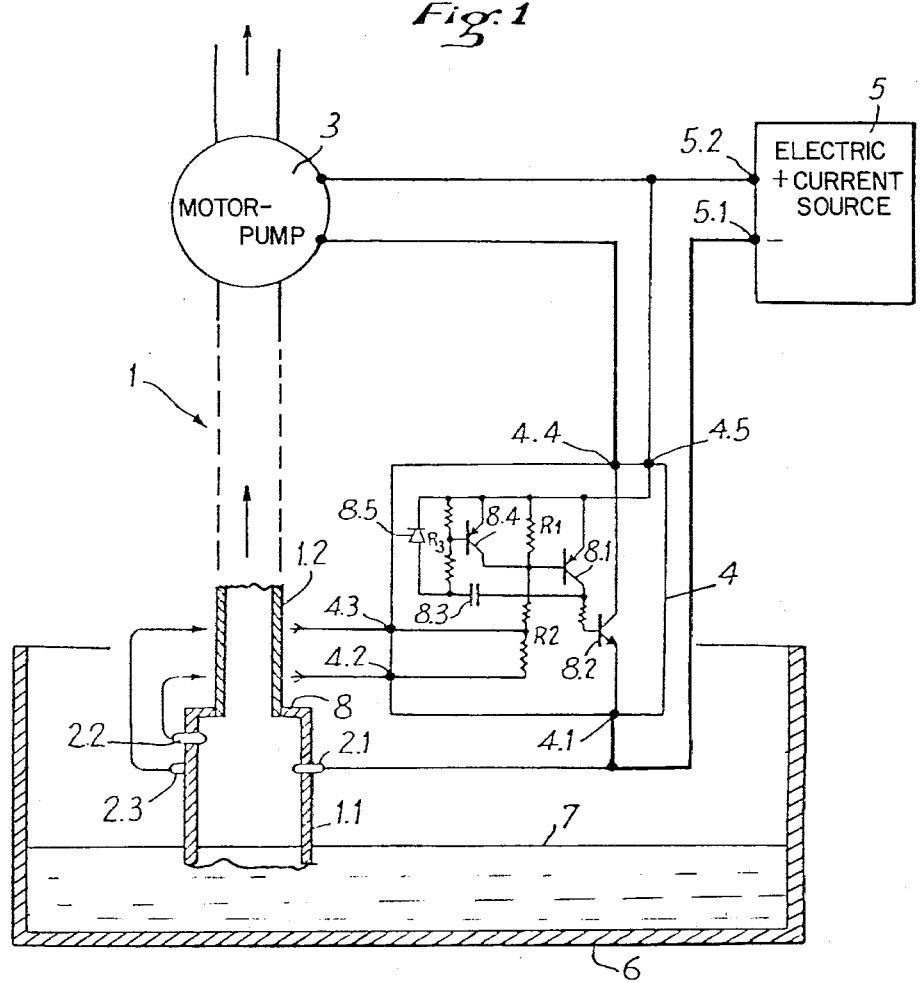
FIG. 1 is a general diagrammatical view of a control detector of the invention.

A suction pipe 1 of a motor-pump unit 3 extends downwardly to penetrate into a space bounded schematically by a wall of a tank 6 in which a liquid, for example seawater, can accumulate until it reaches an upper level. When the level 7 of the liquid reaches this upper level the motor-pump unit 3 must be put into operation in order to empty the tank 6 until the moment when the pump stops spontaneously. The motor-pump unit 3 can be supplied with suitable electric current from a source 5 having two terminals 5.1 and 5.2. The pump is actuated when necessary by means of an electronic control circuit 4 which has five terminals given the references 4.1 to 4.5. One input terminal 4.1 is connected both to a terminal 5.1 of the source 5 and to a detection electrode 2.1 and a second input terminal 4.2 is connected to a second detection electrode 2.2. One output terminal 4.4 is connected to a terminal of the motor of the unit 3, and the second terminal of this motor is connected to the second terminal 5.2 of the source 5, whilst the terminal 4.5 of the circuit 4 is a supply terminal which is connected to the second terminal 5.2 of the source 5. The purpose of the terminal 4.3 of the circuit 4 will be described hereinafter together with the embodiment of the control circuit 4 illustrated in FIG. 1. The control circuit 4 acts as an amplifier interposed between the control electrodes 2.1, 2.2 and the assembly comprising the source 5 and the motor of the motor-pump unit 3.

The suction pipe 1 of the unit 3 has an upper portion 1.2, which is generally in the form of a tube of a material which may be an insulator or a conductor of electricity. The upper portion 1.2 is extended downwardly by a lower portion 1.1 of electrically insulating material which has a larger dimension in the transverse direction than that of the upper portion 1.2, for example, the portion 1.1 comprises a tube of larger diameter. The lower portion 1.1 may be mounted coaxially with the upper portion 1.2 of which it forms an extension and to which it is joined by a shoulder 8. The shoulder 8 corresponds in dimension to that of a peripheral zone defined by the larger dimension of the portion 1.1 relative to the transverse dimension of the upper portion 1.2. It is not necessary for this peripheral zone to be annular as in the present example. It is sufficient for such a peripheral zone to exist on at least a sector between the upper portion 1.2 and the lower portion 1.1, with a connecting shoulder joining them together.

The two detection electrodes 2.1 and 2.2 are mounted on the portion 1.1 and at least one of them, the electrode 2.1 in the present example, is disposed below the connecting shoulder such that it does not project internally of the peripheral zone that is, it does not project internally of the corresponding dimension of the upper portion 1.2 of the suction pipe 1. The second electrode 2.2 may be disposed in the same manner below the shoulder 8, angularly offset relative to the first electrode 2.1. In the embodiment of FIG. 1 the two electrodes 2.1 and 2.2 are angularly spaced by 180°.

FIG. 2 shows a modified arrangement in which the electrode 2.1 is set back as described above, whilst the electrode 2.2 projects internally beyond the peripheral zone of larger dimension of the portion 1.1, that is, beyond the shoulder 8. Starting from the portion 1.1 this electrode 2.2 is insulated over a large part of its length and is bared at its end region so as to be exposed in a central zone which corresponds to the passage section of the upper portion 1.2 of the suction pipe.

The portion 1.1 is positioned in the tank 6 to correspond in the vertical direction to the upper limit which can be reached by the level 7 of the liquid, at which limit the motor-pump unit 3 must be actuated.

It is not essential to mount the electrodes 2.1 and 2.2 such that they only project into the interior of the insulating portion 1.1; they may be mounted through the wall of this portion 1.1 so as to project both internally and externally from the latter, as can be seen in FIG. 1.

When the level 7 of the liquid rises and contact is made with the two electrodes 2.1 and 2.2, an electric current is produced at the input of the amplifier circuit 4 and gives rise to a current flow through the circuit shown in heavier lines in FIG. 1 and containing the motor-pump unit 3. The liquid drawn into the suction pipe keeps the contact closed between the electrodes 2.1 and 2.2, and the pump operates until an insulating fluid, for example air, interrupts the flow of current between these electrodes. When the pump stops, a certain volume of liquid will flow downwardly, but since at least one of the electrodes is protected by the shoulder 8 the pump does not start up at that moment. Only the rising of the level can bring about the operation of the motor-pump unit 3.

A description will now be given of the control circuit 4 shown in FIG. 1 and adapted to be used with a low voltage direct current source 5. The circuit illustrated is provided with a time delay means providing additional protection against undesirable restarting of the pump a short time after it has stopped.

The positive pole 5.2 of the source 5 is connected to the terminal 4.5, to which is also connected the emitter of an amplifier transistor 8.1 whose collector is connected to the base of a power transistor 8.2 acting as a switch for the pump motor and connected between the terminals 4.4 and 4.1 by its collector and emitter respectively.

The current circulating between the electrodes when the latter are immersed in the liquid passes into a chain of resistors R1, R2 connected between the terminal 4.5 and the terminal 4.2 before returning to the negative pole 5.1 of the source 5. The passing of this current switches the two transistors 8.1 and 8.2 into conduction.

An assembly comprising a capacitor 8.3, a transistor 8.4, and a diode 8.5 constitutes a time delay means acting when the current of the electrodes is broken, so as to delay any possible restarting. During the operation of the pump the transistor 8.4 connected in parallel to the resistor R1 is cut off, the transistor 8.1 is conductive, and the capacitor 8.3 has no voltage at its terminals, while the diode is connected so as to serve as a discharge circuit. As soon as any incipient breaking of the current between the electrodes reduces the conduction of the transistor 8.1, the capacitor 8.3 starts to charge up through a resistor bridge R3 connected to the base of the transistor 8.4. The latter goes into conduction and short-circuits the emitter-base input of the transistor 8.1, forcing the latter to cut off completely. The transistor 8.1 remains cut off, as well as the transistor 8.2, as long as the charging of the capacitor with a low current continues. During this time the electrodes are inhibited and cannot resume activity until the end of the charging of the capacitor, when the transistor 8.4 is cut off again. The two transistors 8.1 and 8.4 act as a monostable multivibrator triggered by the break in conduction of the electrodes.

In this embodiment, it is necessary to cool the housing of the power transistor 8.2 during the operation of the pump. This cooling is advantageously achieved by fastening this transistor on the portion 1.2 of the suction pipe when the latter is of metal, with the interposition of thin electrical insulation if the collector of the transistor is electrically connected to its case.

Equivalent circuits, may be used without departing from the scope of the invention, when a source 5 of alternating current is available.

When the liquid to be pumped is a poor conductor of electricity, the terminal 4.3 of the circuit 4 is connected on the one hand to an intermediate point on the resistor R2 and on the other hand to a supplementary electrode 2.3 which is mounted near the electrode 2.2, preferably below the latter and only on the outside of the insulating portion 1.1. A more sensitive input is thus obtained, so that clean starting of the unit 3 is achieved as soon as the liquid makes contact with the two electrodes 2.3 and 2.1. For this reason it is preferable in this case to place these two electrodes at the same height, angularly spaced preferably by 180°, and to place the electrode 2.2 above the electrode 2.3. At the end of the pumping of the liquid a clean stop is also obtained because the electrode 2.3 having greater sensitivity is outside the suction pipe and the two electrodes 2.1 and 2.2 are protected against falling liquid in the suction pipe 1.

Various modifications can be made in order to adapt the detector to the conditions of its use. For example, the angular spacing of the electrodes can be chosen to be between 0° and 180° in dependence on the conditions of use. In a ship an angular spacing of 180° is to be preferred because it permits an inclination of the suction pipe of up to 45° relative to the vertical without the operation of the detector being disturbed.

I claim:

1. In apparatus for pumping liquid from a tank, the apparatus comprising a suction pump having a suction pipe extending into the tank and a control circuit for controlling the operation of the pump, a detector connected to the control circuit and arranged to control the operation of the pump in dependence upon the level of liquid within the tank, the detector comprising an elongate member of insulating material connected to the free end of the suction pipe and extending below an upper level for liquid in the tank, said member being spaced in the transverse direction outwardly of the suction pipe to thereby define a peripheral zone between the suction pipe and said member, and at least first and second spaced electrodes mounted on said member so as to extend inwardly of said member, at least the first electrode not extending beyond said peripheral zone.

2. A detector according to claim 1, wherein said member is tubular, is disposed coaxially with the free end of the suction pipe, and has a larger diameter than that of said free end of the suction pipe, and wherein said member is connected to said free end by an annular shoulder, and said two electrodes do not extend inwardly beyond said shoulder.

3. A detector according to claim 1, wherein said first electrode does not extend inwardly beyond the peripheral zone, and said second electrode extends inwardly beyond said peripheral zone as far as a central zone axially aligned with the passage through the suction pipe.

4. A detector according to claim 1, 2 or 3, wherein said first and second electrodes are angularly spaced by an angle in the range from 0° to 180°.

5. A detector according to claim 1, wherein said control circuit includes a time delay means arranged to delay for a predetermined time the restarting of the pump after a stoppage.

6. A detector according to claim 1, further comprising a third electrode mounted on the outer face of said member and associated with one of said first and second electrodes, and wherein the control circuit has a sensitive input to which this third electrode is connected.

7. A detector according to claim 6, wherein said first and second electrodes are mounted so as to project both inwardly and outwardly of said member, said first and second electrodes being angularly spaced.

8. A detector according to claim 7, wherein said first and second electrodes are spaced by an angle of 180°.

9. A detector according to claim 8, wherein said third electrode is mounted at the same level as one of the first and second electrodes, and the other of said first and second electrodes is mounted above said third electrode.

* * * * *